United States Patent [19]

Thompson

[11] 4,309,747

[45] Jan. 5, 1982

[54] HIGH CURRENT, HIGH VOLTAGE MULTIPLICATION APPARATUS

[75] Inventor: Chester C. Thompson, East Hills, N.Y.

[73] Assignee: Radiation Dynamics, Inc., Melville, N.Y.

[21] Appl. No.: 166,655

[22] Filed: Jul. 7, 1980

[51] Int. Cl.³ .............................................. H02M 7/10
[52] U.S. Cl. ..................................... 363/61; 361/235
[58] Field of Search ................. 361/235, 227; 363/59, 363/60, 61; 307/110; 320/1

[56] References Cited

U.S. PATENT DOCUMENTS

| 2,875,394 | 2/1959 | Cleland | 363/59 |
| 3,723,846 | 3/1973 | Thompson, Jr. | 363/61 |
| 3,908,160 | 9/1975 | Thompson, Jr. et al. | 363/61 |

*Primary Examiner*—William M. Shoop
*Attorney, Agent, or Firm*—Howard L. Rose

[57] ABSTRACT

A higher current capability is provided in a high voltage accelerator of the Dynamitron type (U.S. Pat. No. 2,875,394) by paralleling basic building blocks whereby increased current is achieved without any change in the circuits of the basic building block which are interleaved to permit parallel connection and thus current multiplication without affecting machine voltage or performance.

10 Claims, 6 Drawing Figures

HIGH CURRENT, HIGH VOLTAGE MULTIPLICATION APPARATUS

TECHNICAL FIELD

The present invention relates to high voltage accelerators and more specifically to high current, high voltage electron or ion beam accelerators.

BACKGROUND ART

In my prior U.S. Pat. No. 3,723,846, reference is made to the fact that in industrial applications high current is an essential factor in such machines. The patent provides a capacitor structure which permits the realization of higher currents with low frequency supplies so that solid state devices may be employed in place of vacuum tubes and further suggests employing full wave rectification to provide in a sense parallel operation, i.e. two half wave rectifier circuits, to increase current.

The currents that can be realized by the apparatus of my prior patent are suitable for present needs but not necessarily the requirements in the forseeable future. Further, the apparatus required a special capacitor structure rather than the conventional structure employed in the standard Dynamitron, i.e. the apparatus of U.S. Pat. No. 2,875,394. Although the patented structure is useful in special situations, it is not suitable for use as a mechanism for providing high current standard production equipment.

An alternative approach that has been proposed to achieve increased current is to parallel rectifiers in each stage. The difficulty with this approach is twofold; first, diodes have different firing voltages and current capacities so that the system cannot be balanced, and second, it is not possible without utilizing prohibitively expensive sensing circuits to determine when one such diode in a multiple is not functioning. The first problem can be solved theoretically by inserting a resistor in series with each diode but the IR losses make such an approach wholly impractical.

It is an object of the present invention to provide a high voltage accelerator constructed of conventional building blocks in which the current of the machine may be increased as desired by increasing the number of such building blocks and connecting them in dual multiple parallel circuits.

It is another object of the present invention to provide a standard rectifier stage including capacitors and rectifiers from which a high voltage accelerator may be readily assembled and wherein a preselected number of units are physically arrayed serially (thereby affecting only the length of the machine) and interconnected in series and parallel as desired whereby to determine voltage and current, respectively, of the final apparatus.

It is yet another object of the present invention to provide parallel arrays of capacitor-diode rectifier circuits of standard construction and to produce current carrying symmetry as an inherent function of the design.

It is still another object of the present invention to provide a multiple parallel path rectifier circuit permitting independent monitoring of current in each such path whereby to trigger shut-down upon failure of a path.

Another object of the present invention is to provide an apparatus capable of achieving the objects set forth above which apparatus may be executed as a half wave or full wave and/or single or multiphase rectifier circuit.

DISCLOSURE OF THE INVENTION

The present invention utilizes as a basic voltage supply to the apparatus, an r.f. source and a step up transformer supplying opposed elongated capacitor plates. Individual rectifier stages forming the basic building blocks referred to above are arrayed serially along and capacitively coupled to the elongated capacitor plates to receive r.f. energy therefrom. Each rectifier stage includes a pair of capacitor plates and a rectifier array connected between such plates, each capacitor plate being disposed in spaced relationship to a different one of the elongated capacitor plates and capacitively coupled thereto.

In practical realization each rectifier in a rectifier stage is in fact a number of diodes connected in series across the capacitor plates, the number of diodes being determined by the inverse voltage across the capacitor plates and the inverse voltage capacity of each diode.

For purposes of explanation of the present invention, it is assumed that each basic building block, i.e., rectifier stage, produces 20,000 volts d.c. If a 1 million volt machine is to be provided then 50 rectifier stages are required all connected in series.

If it is desired to increase the total current produced by the machine then full wave rectification may be employed but as indicated above the increase provided by such an arrangement is limited.

In accordance with the present invention, multiple parallel paths of series connected rectifier stages, all of substantial identical construction, are provided with the stages of parallel paths alternating in position along a common physical path so that the same pair of elongated capacitor plates supply all of the rectifier stages.

In addition, the present invention makes use of the presently available r.f. transformers used for voltage step up for supplying the elongated capacitor plates and the resonant frequency of the system. Specifically, as will be demonstrated subsequently, the resonant frequency of the system may be maintained in spite of increases in capacitance of the supply tank circuit as rectifier stages are added by paralleling step up transformers to increase inductance and provide the requisite compensation. In consequence, the apparatus of the present invention is able to utilize the presently available r.f. power oscillator and high powered triodes utilized as well as the same beam tubes and basic pressurized vessel components. In the event the current requirements exceed the capacity of the present oscillators additional oscillators connected in parallel and utilizing standard elements are provided.

Thus the present invention provides a mechanism for increasing current capacity of a machine to several multiples of the capacity of present machines utilizing presently available, tried and proven, components. As indicated, if the current desired exceeds the capacity of the present step-up transformers, they may be paralleled and the same is true of the r.f. oscillator source.

A further feature of the invention resides in the fact that each parallel rectifier string may be independently monitored since each string or path is electrically independent of the others. Thus, failures may be rapidly detected and the source of the problem known.

BEST MODES OF CARRYING OUT THE INVENTION

Figure 1:
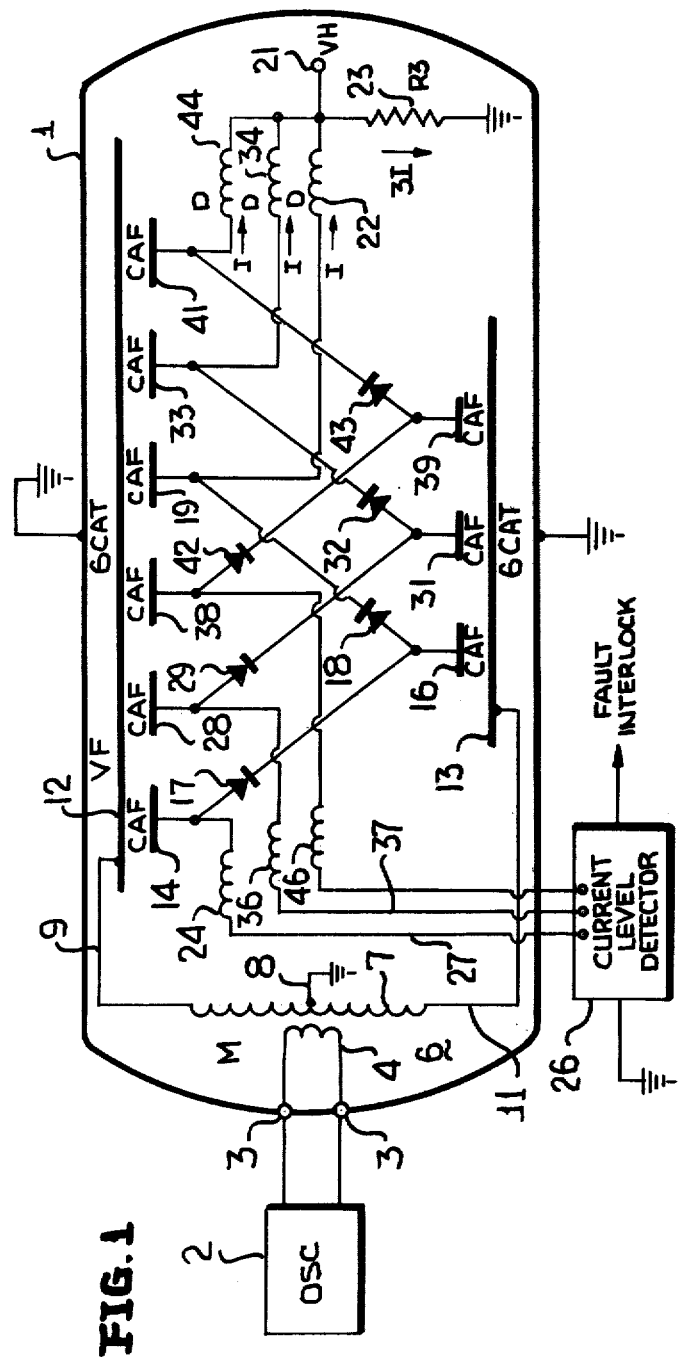
FIG. 1 is a schematic wiring diagram of a portion of the power supply of the present invention.

Referring specifically to FIG. 1 of the accompanying drawings, there is illustrated a high voltage, high current power supply for a beam tube accelerator.

The apparatus is positioned in a pressure vessel 1 serving as apparatus ground. The output voltage of an oscillator 2 of a power supply providing, for instance, 750 KW of power, is supplied through bushing 3 in the vessel 1 to the primary winding 4 of step-up power transformer 6. Secondary winding 7 of transformer 6 is center grounded at 8 and has its opposite ends connected via leads 9 and 11 to elongated capacitor plates, hereinafter r.f. electrodes 12 and 13, respectively. The r.f. electrodes are curved about the same center of curvature as the vessel 1 and extend around a large part of the circle defined by their radius of curvature, whereby to provide large capacitive effects.

As previously indicated, each rectifier stage consists of two capacitor plates capacitively coupled to plates 12 and 13 and a rectifier stack; for instance capacitor plates 14 and 16 and diode stack 17 connected therebetween; the stack being diagramatically illustrated by a single diode.

In operation, r.f. energy applied to r.f. electrodes 12 and 13, is capacitively coupled to capacitor plates 14 and 16 across rectifier stack 17 where the r.f. is half wave rectified and capacitor CAF, is charged to a predetermined voltage. This voltage may be employed as the d.c. output voltage at 20 KV, but in practice is added to the rectified voltage of numerous stages to achieve a desired high voltage. In FIG. 1, a two stage device is illustrated with a second rectifier stack 18 connected between capacitor plate 16 and a further capacitor plate 19 associated with r.f. electrode 12.

Operation of the second stage, plates 16 and 19 and rectifier stack 18, occurs in the half wave of the r.f. voltage out of phase with the operation of the first stage. Thus, capacitor $CAF_2$ is charged and the charges on capacitors $CAF_1$ and $CAF_2$ are added to provide, according to the above example, 40 KV. In the illustrated example, the voltage across $CAF_2$ is connected to a high voltage terminal 21 via an isolating choke 22. The choke 22 presents a high impedance to r.f. thus serving to isolate the r.f. from the high voltage terminal 21. The circuit is completed to ground via resistor 23.

It should be noted that the low voltage side of the two rectifier stages described above are returned to ground via a choke 24 serving the same purpose as choke 22. A current level indicator 26, which may be nothing more than a current transformer disposed about the lead 27 to ground and a meter is utilized to sense current in the rectifier arrangement.

In accordance with the present invention, the current supplied by such a supply may readily be increased, tripled in the illustrated embodiment, by paralleling identical rectifier stages and thereby requiring changes only in the length of the r.f. electrodes 12 and 13 and the pressure vessel 1.

Referring again to FIG. 1 of the accompanying drawings, a second two stage rectifier array in parallel with the one previously discussed comprises capacitor plate 28, rectifier stack 29, capacitor plate 31, rectifier stack 32 and a third capacitor plate 33. The plate 33 is connected via choke 34 to the terminal 21 and the plate 28 is connected via choke 36 and lead 37 to ground through a current sensing circuit in the detector 26.

A third stage consisting of capacitor plates 38, 39 and 41, diode stacks 42 and 43 and chokes 44 and 46 is also provided.

In the above arrangement, the only change from a standard machine circuit component is the value of resistor 23, the value being reduced three-fold to accommodate the three-fold increase in current.

Figures 2, 4:
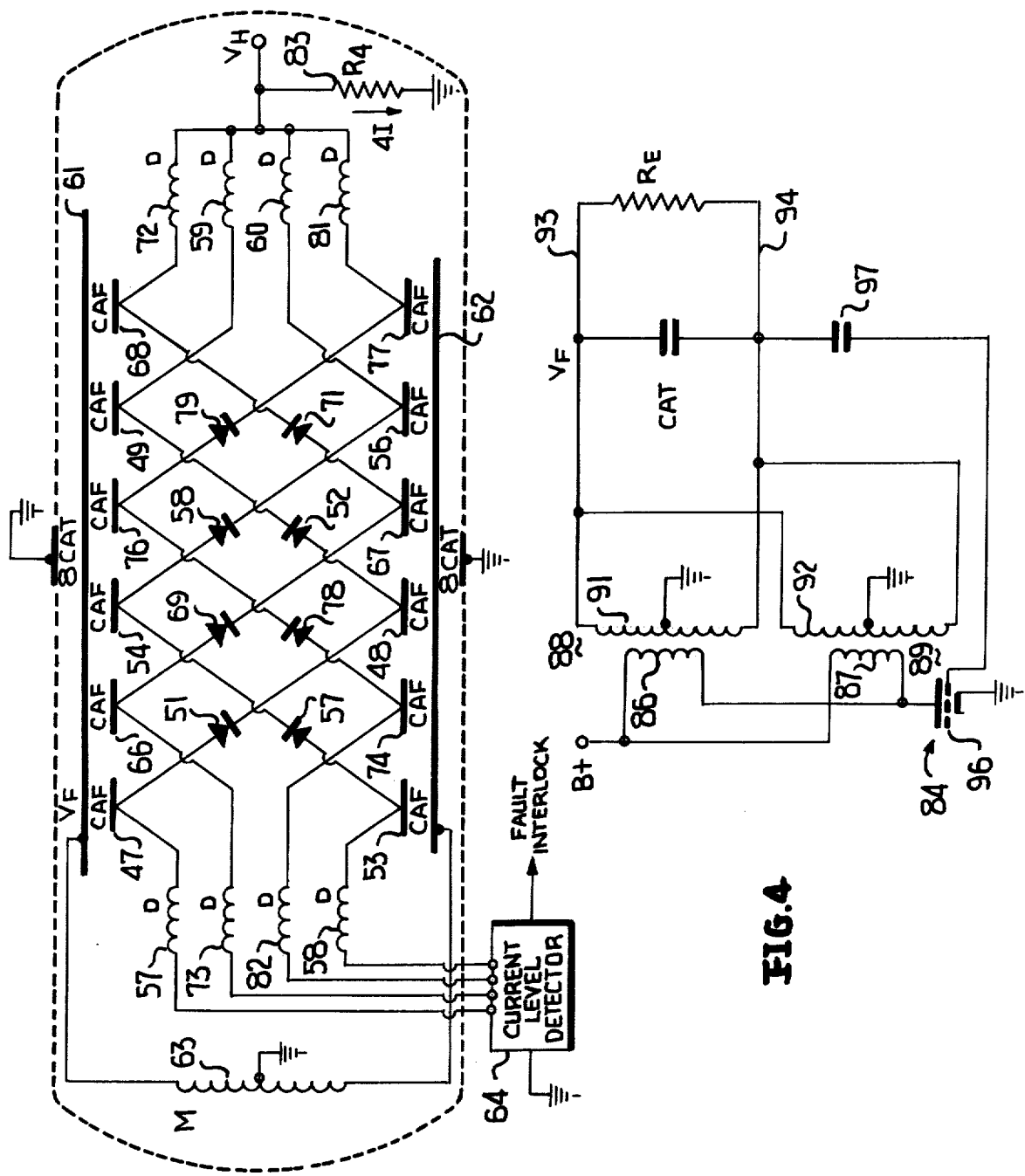
FIG. 2 is a schematic wiring diagram of a part of a full wave supply according to the present invention.
FIG. 4 is a circuit diagram of the basic oscillator circuit employed in the present invention.

The above circuit is a half wave rectifier circuit; conversion to a full wave circuit being along standard lines as illustrated in FIG. 2 of the accompanying drawings. In this Figure, there are provided two parallel full wave circuits. A first full wave circuit comprises capacitor rings 47, 48 and 49 and rectifier stacks 51 and 52 for a first half wave part of the circuit, and capacitor rings 53, 54 and 56 and rectifier stacks 57 and 58 for the other half wave part of the full wave circuit. Appropriate chokes 57–60 are employed as well as r.f. electrodes 61 and 62, transformer secondary winding 63, and current level detector 64 to complete the circuit of two full wave stages.

In accordance with the present invention, the apparatus provides a parallel full wave rectifier circuit that is interleaved physically with the first circuit discussed above. The first half wave circuit of the parallel circuit comprises capacitor plates 66, 67 and 68, rectifier stacks 69 and 71 and chokes 72 and 73. The other half wave circuit comprises capacitor plates 74, 76 and 77, rectifier stacks 78 and 79 and chokes 81 and 82.

Paralleling circuits does require extending the electrodes and specifically if the current is doubled, twice as many stages are required and the length of the r.f. electrodes must be doubled. In the circuit of FIG. 1, the r.f. electrodes must be tripled in length relative to a conventional half wave machine.

It should be noted that the value of output resistor 83 is one-fourth that employed in a half wave circuit as a result of quadrupling the current.

In order to design a machine such as those illustrated in FIGS. 1 and 2, certain factors must be taken into account; these relating to such problems as the effect of increased capacitance on resonance of the oscillator tank circuit, the effect of increased current on the transformer winding and oscillator circuits and the increased length of the pressure vessel on space requirements of the machine.

Figure 3:
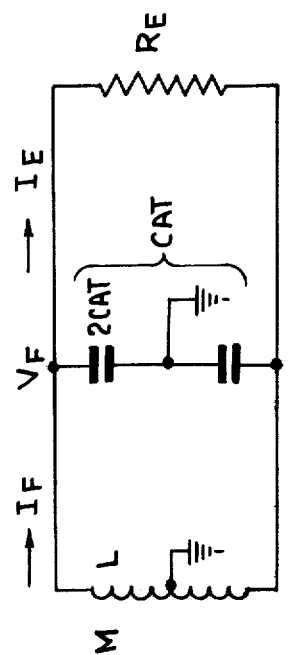
FIG. 3 illustrates the equivalent circuit of diagram of FIG. 1.

In order to address the above problems reference is made to FIG. 3 of the accompanying drawings which illustrates the equivalent circuit diagram of the oscillator tank circuit. It is readily noted that the inductance of the transformer secondary winding (L), the capacitance ($C_{AT}$) of the r.f. electrodes to the pressure vessel and the resistance ($R_E$) of the equipment constitute the impedance elements of the oscillator tank circuit.

In order for a tank circuit to sustain oscillation under load, the loaded Q of the tank must be greater than 10, i.e.

$$Q > 10$$

$$Q = W(C_{AT})(R_E) \text{ so that}$$

$$W(C_{AT})(R_E) > 10$$

where $W = 2\pi f$

Expressing the above in terms of current:

$$I_F \leq 10 I_E$$

where $I_F$ is the circulating current in the tank circuit and $I_E$ is the load current. The current $I_F$ determines design of the current capacity r.f. transformer while $V_F$, tank circuit voltage determines its voltage gradient and resulting design. Only the former factor is of interest herein.

As indicated above, the addition of parallel circuits to increase current capacity increases capacitance due to elongation of the r.f. electrodes. The effect of the above is seen in the following equations:

$$I_F = V_F \sqrt{\frac{C_{AT}}{L}}; \text{ and} \quad (1)$$

$$f = \frac{1}{2\pi \sqrt{C_{AT}L}} \quad (2)$$

at the resonant frequency.

The value of $C_{AT}$ is proportional to the number of rectifier stages which in turn are a function of the desired output current. Thus, as current rises the value of L must decrease to satisfy both of the above Equations 1 and 2.

An example of the effects of doubling current and therefore doubling capacitance on the above Equations follows:

$$I_F = V_F \sqrt{\frac{2C_{AT}}{L}} = 1.4 V_F \sqrt{\frac{C_{AT}}{L}}$$

$$2\pi f = \frac{1}{\sqrt{2C_{AT}L}} = \frac{1}{1.4 \sqrt{C_{AT}L}}$$

It is readily seen that the frequency is 40% lower and the tank current 40% higher. The copper losses in the transformer are $(\sqrt{2}I_F)^2$ or twice as large as in the original case. The problems incident to the above change in current requirement may readily be corrected by simply connecting two transformers in parallel. In this case, as illustrated in FIG. 4, the inductance is halved so that:

$$2\pi f = \frac{1}{\sqrt{\frac{1}{2}L(2C_{AT})}} = \frac{1}{\sqrt{LC_{AT}}}; \text{ and}$$

$$I_F = V_F \sqrt{\frac{2C_{AT}}{L/2}} = 2 V_F \sqrt{\frac{C_{AT}}{L}}$$

Although the circulating current in the tank circuit is doubled, the current through each transformer and the resonant frequency are the same as in the single path case.

Referring to FIG. 4, an oscillator tube 84 has primary windings 86 and 87 of step-up transformers 88 and 89 connected in parallel in its plate circuit. Secondary windings 91 and 92 of the step-up transformers are connected in parallel across the r.f. electrodes 93 and 94 with feedback to grid 96 of the tube 84 via a capacitor 97.

As indicated above, the highest power tubes presently available have a rating of 750 KW. If a one million volt machine with one ampere of beam current is to be produced more than one oscillator tube will be required.

Figure 5:
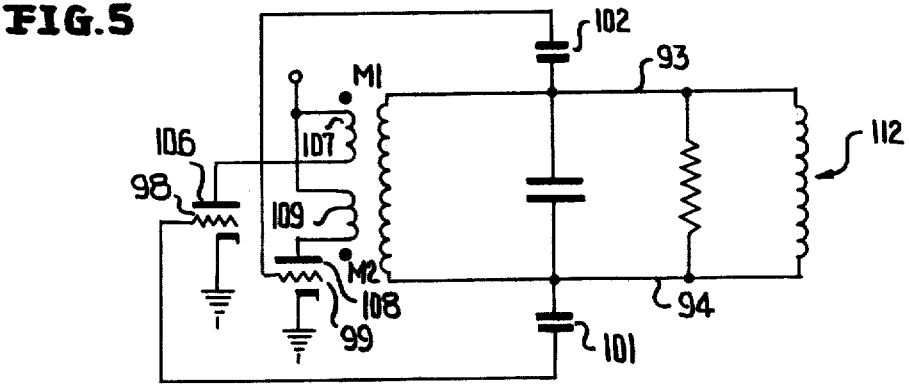
FIG. 5 is an alternative oscillator circuit providing additional current capacity.

Referring specifically to FIG. 5, one form of alternative supply is illustrated. In this arrangement triodes 98 and 99 are connected in push-pull and maintained in isochronism by feedback to their respective grids via capacitors 101 and 102, respectively, from r.f. electrodes 103 and 104. The plate 106 of triode 98 is connected to primary winding 107 of transformer $M_1$ and plate 108 of triode 99 is connected to a second primary winding 109 of transformer $M_1$.

In this arrangement, both primaries feed the same secondary and winding 112 is employed to provide the necessary inductance to maintain a fixed value of frequency. It is obvious that if the $I^2R$ losses in the transformer $M_1$ are too great, the winding 112 may be the secondary winding of a second transformer including windings 112 and 109.

The winding 112 may also be employed as a winding of a pick-off feedback transformer; a secondary winding having opposite ends connected to the grids of tubes 98 and 99 so that capacitors 101 and 102 may be eliminated.

The arrangement of FIG. 5 is acceptable if each tube inherently carries its share of the load within acceptable tolerances. Aging, however, presents a problem which may be overcome by the apparatus of FIG. 6 of the accompanying drawing. In this apparatus, a reference control voltage is established and the d.c. output voltage of the machine is compared therewith to correct the output voltage of the supply if it deviates from the control voltage. Further, the circuit is employed to adjust three separate oscillator tubes to insure that the load is shared substantially equally.

Figure 6:
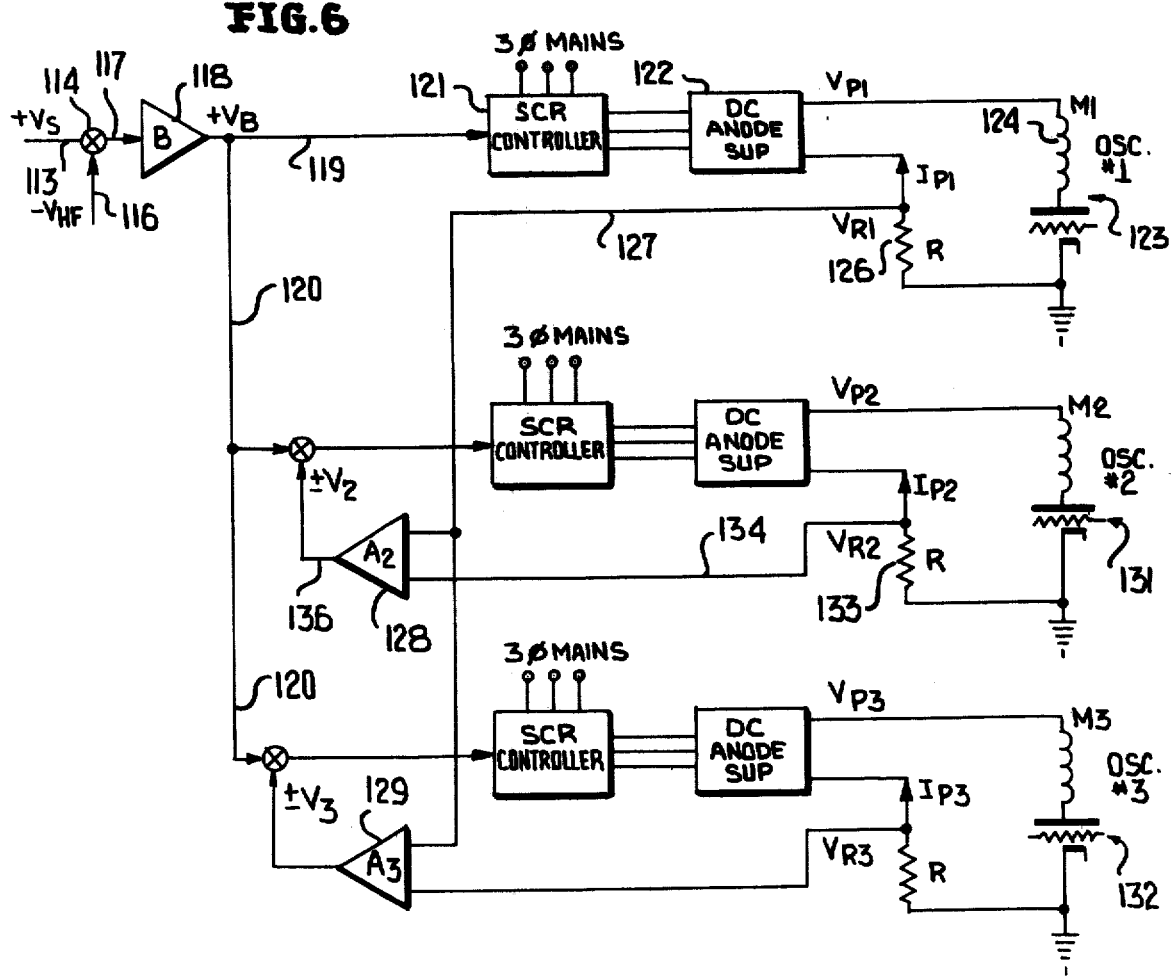
FIG. 6 is a circuit diagram of an oscillator circuit wherein two oscillator tubes are controlled to carry generally equal currents.

Referring specifically to FIG. 6, a signal $V_S$ appearing on a lead 113 is compared in a comparator 114 with a negative voltage $V_{HF}$ on lead 116 which is proportioned to the d.c. output voltage of the rectifier apparatus of, for instance, FIG. 1. The difference signal appearing on output lead 117 of comparator 114 is applied to amplifier 118 to provide an amplified difference, if any, between $V_S$ and $V_{HF}$ on leads 119 and 120.

The lead 119 is applied to the control electrodes of the SCR's in a three phase supply 121 to control the firing angle thereof and therefore the duty cycle of the $3\phi$ voltage supplied to a d.c. anode power supply 122. The supply 122 supplies d.c. voltage to oscillator tube 123 having a primary winding 124 of a step-up transformer connected in its plate circuit and a current sensing resistor 126 connected in its cathode circuit. A lead 127 is connected to the ungrounded side of resistor 126 to provide a voltage on lead 127 proportional to the current being supplied to its associated tank circuit.

The voltage on lead 127 is connected to one input of each of differential amplifiers 128 and 129 so that the current outputs of the two other parallel supplies generally designated by reference numerals 131 and 132 may be slaved to the output of oscillator tube 123. Specifically, the output current of supply 131 is sensed by a resistor 133 and applied via lead 134 to a second input of amplifier 128 which produces an output signal on lead 136 only when there is a difference between the voltage on leads 127 and 134. The voltage on lead 136 is applied to a variable attenuator to adjust the voltage on lead 120 to a value to maintain the current output from stage 131 within prescribed tolerances, ±5% to ±10% of the current output of tube 123. An identical arrangement is employed with supply stage 132; the current output of stage 132 being compared in amplifier 129 with the current output of tube 123.

The system of FIG. 6 is a closed loop system as a result of feedback on lead 116 with each stage assured of carrying its share of the load. A system such as illustrated can carry a load up to 2.2 megavolts.

Once given the above disclosure, many other features, modifications and improvements will become apparent to the skilled artisan. Such other modifications, features and improvements are, therefore, considered a part of this invention, the scope of which is to be determined by the following claims.

I claim:

1. A high voltage, high current accelerator power supply providing parallel circuits, comprising:
   a pair of elongated electrodes spaced apart and extending generally parallel to one another,
   a first plurality of rectifier stages disposed between said electrodes and physically arrayed serially along the elongated extension of said electrodes,
   each said rectifier stages comprising a pair of spaced apart electrodes each discposed adjacent a different one of said elongated electrodes and a plurality of series connected rectifiers extending between said spaced apart electrodes, means connecting every $n^{th}$ rectifier stage in a first series circuit between a low voltage terminal and a high voltage terminal with the diodes of every other stage in said first circuit being oppositely polled and where n is an integer equal to the number of parallel circuits desired,
   means connecting every $(n+1)^{th}$ stage in a second series circuit between said low voltage terminal and said high voltage terminal with the diodes of every other stage in said second circuit being oppositely polled and the rectifiers of the lowest voltage stage having the same polling as the rectifiers of the lowest voltage stage of said first series circuit, and
   a resonant circuit including an inductance connected between said elongated electrodes.

2. The combination according to claim 1 further comprising:
   a tank enclosing said elongated electrodes and said rectifier stages, and
   said resonant circuit including the capacitance to said tank of said elongated electrodes.

3. The combination according to claim 1 or 2 further comprising:
   a second plurality of rectifier stages equal in number to said first plurality and having electrodes and rectifiers
   said rectifier stages of said second plurality of rectifier stages being interconnected to provide n number of series connected circuits of said rectifier stages extending between said low and high voltage terminals,
   said electrodes of said first plurality of rectifier stages being interleaved with said electrodes of said second plurality of rectifier stages along said elongated electrodes on an n for n basis, and
   said rectifiers of the rectifier stages of said first and second plurality of rectifier stages being oppositely polled.

4. The combination according to claim 2 or 3 further comprising:
   an r.f. oscillator having an active element and including said resonant circuit,
   a step-up transformer having its primary winding connected to said active element, and
   said inductance comprising a secondary winding of said step-up transformer.

5. The combination according to claim 4 further comprising:
   a separate high frequency choke extending between each of said series circuits and said low voltage terminals, and
   means for monitoring current in each of said circuits.

6. The combination according to claim 4 further comprising:
   a second primary winding of said step-up transformer, and
   a second r.f. oscillator having an active element and said second primary winding of said step-up transformer connected thereto.

7. The combination according to claim 4 further comprising:
   a second step-up transformer having a primary winding and a secondary winding connected in parallel with said secondary winding of the aforesaid step-up transformer, and
   a second r.f. oscillator including an active element with said second primary winding of said second step-up transformer connected thereto.

8. The combination according to claim 7 further comprising:
   means for maintaining said oscillator in synchronism.

9. The combination according to claim 4 wherein:
   said power supply has n number of r.f. oscillators each having an active element and a step-up transformer.

10. A high voltage, high current half wave power supply comprising:
    a pair of elongated capacitor electrodes,
    a plurality of rectifier stages each including a pair of capacitor electrodes and a plurality of rectifiers extending therebetween,
    said electrodes of each stage each being capacitively coupled to a different one of said elongated electrodes,
    said electrodes of said stages being disposed physically in series along said elongated electrodes,
    a high voltage terminal,
    a low voltage terminal,
    means connecting said rectifier stages in a plurality, n, of series connected rectifier circuits extending between said low and high voltage terminals,
    each said plurality of circuits containing T/n rectifier stages where T is equal to the total number of rectifier stages provided, and
    said rectifier stages of each series circuit being interleaved with the rectifier stages of said other series circuits on a one for one basis.

* * * * *